(12) United States Patent
Yamada (10) Patent No.: US 12,072,735 B2
(45) Date of Patent: Aug. 27, 2024

(54) WEARABLE DEVICE

(71) Applicant: Japan Display Inc., Tokyo (JP)

(72) Inventor: Kazuyuki Yamada, Tokyo (JP)

(73) Assignee: Japan Display Inc., Tokyo (JP)

( * ) Notice: Subject to any disclaimer, the term of this patent is extended or adjusted under 35 U.S.C. 154(b) by 261 days.

(21) Appl. No.: 17/645,345

(22) Filed: Dec. 21, 2021

(65) Prior Publication Data

US 2022/0206526 A1    Jun. 30, 2022

(30) Foreign Application Priority Data

Dec. 29, 2020 (JP) ................... 2020-219888

(51) Int. Cl.
| | |
|---|---|
| *G06F 1/16* | (2006.01) |
| *G06F 3/041* | (2006.01) |
| *G06F 3/046* | (2006.01) |
| *G06F 21/32* | (2013.01) |
| *G06V 40/145* | (2022.01) |

(52) U.S. Cl.
CPC ............ *G06F 1/163* (2013.01); *G06F 1/1652* (2013.01); *G06F 3/04164* (2019.05); *G06F 3/046* (2013.01); *G06F 21/32* (2013.01); *G06V 40/145* (2022.01)

(58) Field of Classification Search
CPC .... G06F 1/163; G06F 3/04164; G06F 1/1652; G06F 3/046; G06F 21/32; G06V 40/145
See application file for complete search history.

(56) References Cited

U.S. PATENT DOCUMENTS

| | | | | |
|---|---|---|---|---|
| 11,324,292 | B2 * | 5/2022 | Min ...................... | G06F 1/16 |
| 2015/0147065 | A1 * | 5/2015 | Civelli .................. | G08C 23/04 |
| | | | | 398/107 |
| 2015/0261946 | A1 * | 9/2015 | Yoon ..................... | G06F 21/35 |
| | | | | 726/19 |
| 2016/0034742 | A1 | 2/2016 | Kim et al. | |
| 2017/0062773 | A1 * | 3/2017 | Lee ...................... | H10K 50/8426 |
| 2017/0345802 | A1 * | 11/2017 | Sung ..................... | H01L 33/54 |
| 2018/0348880 | A1 * | 12/2018 | Juliato .................. | G04C 3/002 |
| 2019/0025876 | A1 * | 1/2019 | Hiraide ................ | A61B 5/02108 |
| 2020/0176501 | A1 * | 6/2020 | Togashi ................ | H04N 25/78 |
| 2020/0192423 | A1 * | 6/2020 | Hsu ...................... | H05K 1/028 |
| 2020/0233516 | A1 * | 7/2020 | Hwang ................. | G06F 3/0443 |
| 2020/0279035 | A1 * | 9/2020 | Chang ................. | H04M 1/724094 |

* cited by examiner

*Primary Examiner* — Rockshana D Chowdhury
*Assistant Examiner* — Martin Antonio Asmat Uceda
(74) *Attorney, Agent, or Firm* — Maier & Maier, PLLC (57) ABSTRACT

A wearable device according to an embodiment comprises a body configured to surround the outside of a subject, a light emitting unit arranged on an inner periphery of the body and including at least one first light emitting element, a light-receiving unit arranged on the inner periphery of the body and arranged opposite the light emitting unit, a display unit arranged on an outer periphery of the body and including at least one second light emitting element, and a first flexible substrate mounted with the at least one first light emitting element and the at least one second light emitting element, and the first flexible substrate has a first surface and a second surface opposite to the first surface, and the at least one first light emitting element and the at least one second light emitting element are mounted on the first surface of the first flexible substrate.

7 Claims, 8 Drawing Sheets

WEARABLE DEVICE

CROSS REFERENCE TO RELATED APPLICATIONS

This application is based on and claims the benefit of priority from the prior Japanese Patent Application No. 2020-219888, filed on Dec. 29, 2020, the entire contents of which are incorporated herein by reference.

FIELD

An embodiment of the present disclosure relates to a wearable device.

BACKGROUND

At present, wearable devices capable of being worn on a part of a human body have been developed. Wearable devices include, for example, eyeglass-type devices such as smart glasses, wristwatch-type devices such as smart watches, and ring-type devices such as smart rings. These wearable devices have wireless communication functions and can communicate with other terminals/devices, such as smartphones, or with applications for smartphones. Therefore, various operations by other terminals/devices can be performed via a linked wearable device.

Ring-type wearable devices such as smart rings are more compact than eyeglasses-type and wristwatch-type devices and can be worn on a person's finger in the same way as a ring as an accessory. For example, Japanese Laid Open Patent No. 2016-033815 proposes a ring-type mobile terminal that detects a fingerprint of a finger to be inserted and performs a function based on the detection result.

SUMMARY

A wearable device according to an embodiment of the present disclosure includes a body configured to surround the outside of a subject, a light emitting unit arranged on an inner periphery of the body and including at least one first light emitting element, a light-receiving unit arranged on the inner periphery of the body and arranged opposite the light emitting unit, a display unit arranged on an outer periphery of the body and including at least one second light emitting element, and a first flexible substrate mounted with the at least one first light emitting element and the at least one second light emitting element, wherein the first flexible substrate has a first surface and a second surface opposite to the first surface, and the at least one first light emitting element and the at least one second light emitting element are mounted on the first surface of the first flexible substrate.

DESCRIPTION OF EMBODIMENTS

It is an object of the present disclosure to provide a wearable device that is thinner and lighter.

Hereinafter, embodiments of the present disclosure will be described in detail with reference to the drawings. The following embodiments are examples of embodiments of the present invention, and the present invention is not construed within the limitations of these embodiments.

In the drawings referred to in the present embodiments, the same elements or elements having a similar function are denoted by the identical signs or similar signs (signs each formed simply by adding A, B, etc. to the end of a number), and a repetitive description thereof may be omitted. For convenience of description, the dimensional ratio of the drawings may be different from the actual ratio, or a part of the configuration may be omitted from the drawings.

For convenience of explanation, the phrase "above" or "below" is used for explanation, and for example, the vertical relation between a first member and a second member may be reversed from that shown in the drawing. In the following description, a first surface and a second surface of a substrate do not refer to specific surfaces of the substrate but are used to specify the front surface direction or back surface direction of the substrate, that is, to specify the vertical direction with respect to the substrate.

In this disclosure, the terms "include" and "comprise", and the like are intended to mean the presence of features, numbers, steps, operations, components, parts, or combinations thereof described in the specification, and do not preclude the presence or possibility of addition of one or more other features, numbers, steps, operations, components, parts, or combinations thereof. The singular representation includes multiple representations unless otherwise stated.

First Embodiment

Figure 1:
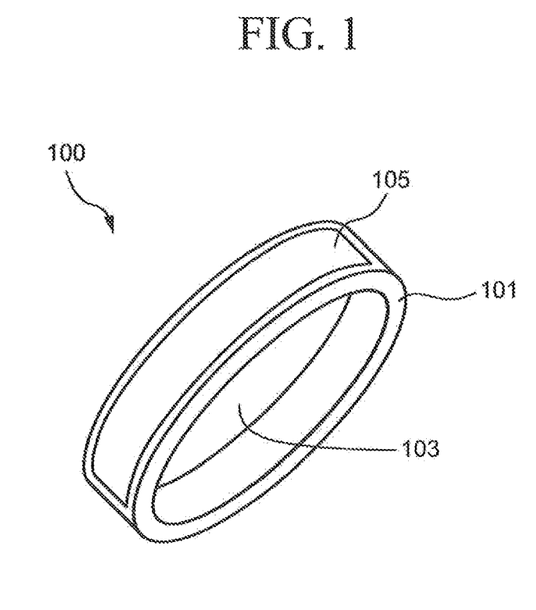
FIG. 1 is a schematic view of a wearable device according to an embodiment, viewed from one direction.
Figure 2A:
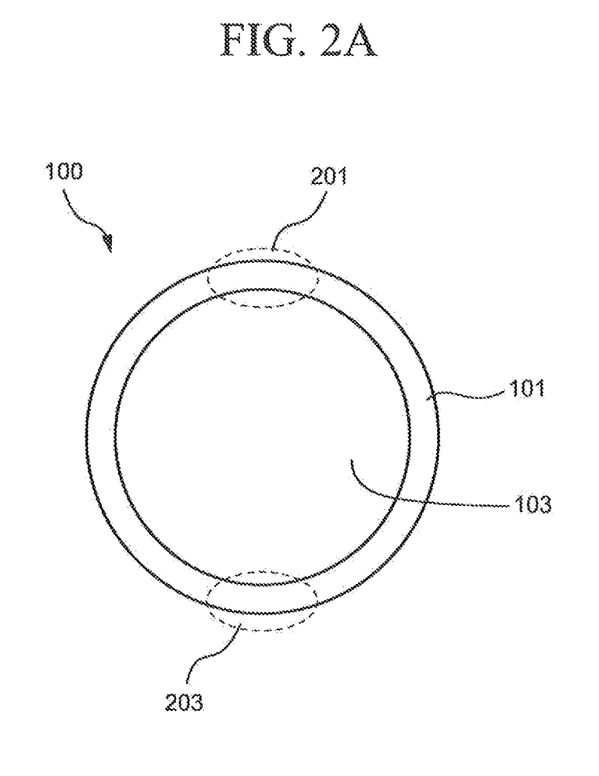
FIG. 2A is a schematic view of the wearable device shown in FIG. 1, viewed from another direction.
Figure 2B:
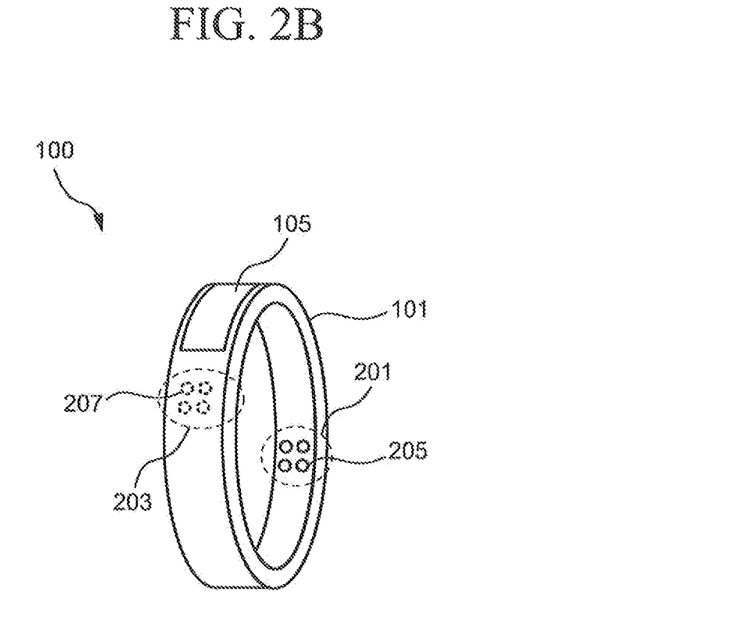
FIG. 2B is a schematic view of the wearable device shown in FIG. 1, viewed from another direction.

FIG. 1 is a schematic view of a wearable device according to the first embodiment of the present disclosure as viewed from one direction. FIG. 2A and FIG. 2B are schematic views of the wearable device shown in FIG. 1, viewed from another direction respectively.

As shown in FIG. 1, FIG. 2A, and FIG. 2B, a wearable device 100 according to the first embodiment includes a ring-shaped body 101 and an opening 103 provided at the center of the body 101.

The body 101 may be composed of a metal, such as stainless steel, a plastic, a resilient material, or the like. A material constituting the outer peripheral side of the body 101 and a material constituting the inner peripheral side facing the opening 103 may be different from each other. The body 101 has a predetermined width and a predetermined thickness. The width and thickness of the body 101 are optional and may vary depending on the position.

Electronic components constituting a memory, a control unit, a communication unit, an input unit, a detection unit, and the like are mounted on the body 101. The memory stores a plurality of application programs executed by the wearable device 100, commands for the operation of the wearable device 100, and the like. The control unit executes the application programs stored in the memory and controls the operation of the entire wearable device 100. The communication unit is wirelessly connected to an external equipment. The input unit receives inputs from a user. The detection unit detects the user's information. Components of the electronic components to be mounted on the body will be described later.

The body 101 has a display area 105 on its surface. The display area 105 is an area on which images are displayed. The display area 105 is provided with an opening to expose a display unit to be described later.

The body 101 further includes a light emitting area 201 and a light-receiving area 203. For example, infrared rays, in particular, near infrared rays may be emitted from the light emitting area 201. The light emitted from the light emitting area 201 is not limited to infrared rays, and visible light may be emitted. The position of the light emitting area 201 in the body 101 is not particularly limited. The light emitting area 201 may be provided on the outer side of the display area 105 or may be provided in the display area 105. FIG. 2B shows the case where the light emitting area 201 is provided on the outer side of the display area 105 as an example. The light-receiving area 203 is an area that receives the light emitted from the light emitting area 201.

The light emitting area 201 and the light-receiving area 203 are provided on the inner periphery of the body 101 so as to face each other. The body 101 may have an opening 205 that transmits infrared rays in the light emitting area 201. The body 101 may have an opening 207 that transmits the infrared rays emitted from the light emitting area 201 in the light-receiving area 203. In FIG. 2B, although four openings 205 are provided in the light emitting area 201, the number of the opening 205 is not limited thereto, may be one or more. Similarly, in FIG. 2B, although four openings 207 are provided in the light-receiving area 203, the number of the opening 207 is not limited thereto, may be one or more. In the case where the material of the body 101 constituting the inner periphery side facing at least the opening 103 is a transparent material, the opening 205 and the opening 207 shown in FIG. 2B may be omitted.

A part of the user's body is inserted into the opening 103. For example, a user's finger may be inserted into the opening 103. A part of the user's arm (e.g., wrist) or a part of the user's feet (e.g., ankle) may be inserted into the opening 103. In the present embodiment, the case where the user's finger is inserted into the opening 103 will be described as an example. That is, the wearable device 100 according to the present embodiment is a ring-type wearable device, a so-called smart ring.

When a finger of a person is inserted into the opening 103, the wearable device 100 performs user authentication for confirming whether the worn person's finger is the registered user's finger. Various authentication methods such as a fingerprint authentication and a finger vein authentication can be applied to the user authentication. The case where the finger vein authentication is performed as the user authentication will be described.

The finger vein authentication is one of biometrics techniques for performing personal authentication using a pattern authentication technique based on an image of a vein pattern of a finger obtained by transmitting infrared rays, for example, near infrared rays, through the finger. A finger vein pattern of the user is registered in advance and stored in the memory. The wearable device 100 emits infrared rays toward the inserted finger upon detecting that the finger of a person has been inserted into the opening 103. Infrared rays are absorbed by hemoglobin in the blood. As a result, the vein shape pattern is obtained as a dark line pattern. The obtained pattern is recorded by a light-receiving element, and it is determined whether the pattern coincides with a registered finger vein pattern by matching with a finger vein pattern of a user registered in advance.

When it is determined that the obtained pattern is authenticated as the finger vein pattern of the user as a result of the determination, that is, when it is determined that the finger vein pattern of the user registered in advance matches the obtained pattern as a result of the determination, the wearable device 100 is in the active state. In the active state, the wearable device 100 accepts an operation of the user wearing the wearable device 100. On the other hand, as a result of the determination, when it is determined that the obtained pattern is not the finger vein pattern of the user, that is, when it is determined that the finger vein pattern of the user registered in advance does not match the obtained pattern, the wearable device 100 is in the locked state. In the locked state, the wearable device 100 does not accept an operation of the user wearing the wearable device 100, and the user cannot use the wearable device 100.

Infrared rays used in the finger vein authentication are emitted from the light emitting area 201. The light emitted from the light emitting area 201 is received by the light-receiving area 203. The light emitting area 201 may be provided with an infrared light emitting diode (IR LED) that emits infrared rays. The light-receiving area 203 may be provided with a CCD camera or a light sensor as a light-receiving element.

Figure 3:
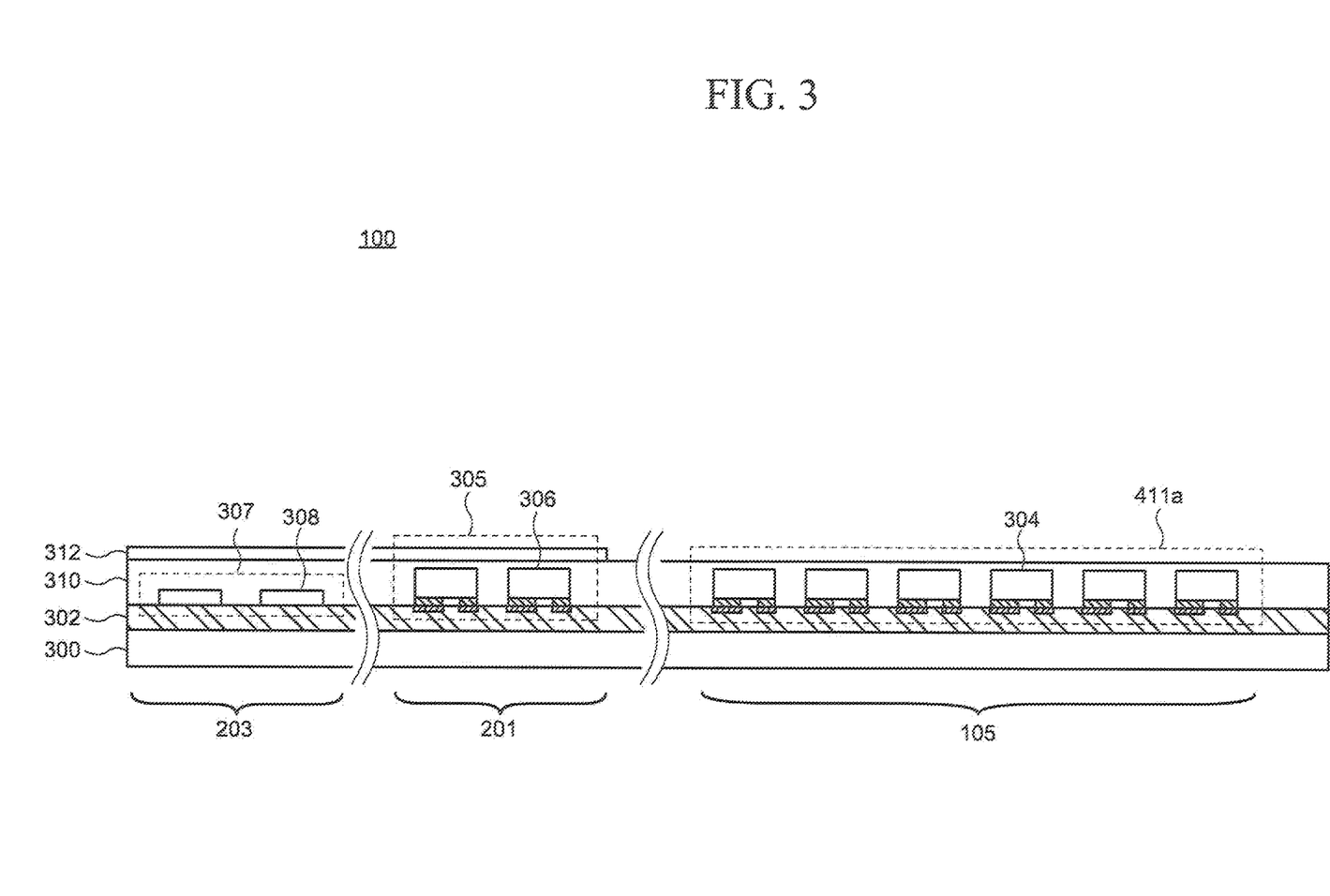
FIG. 3 is a cross-sectional view of a part of a circuit substrate arranged inside a wearable device according to an embodiment.

FIG. 3 is a cross-sectional view of a part of a circuit substrate arranged inside the wearable device 100. In FIG. 3, although a circuit substrate 302 is shown linearly for convenience of explanation, the circuit substrate 302 has flexibility and is provided along the form of the body 101 of the wearable device 100. That is, the circuit substrate 302 is bent at a predetermined curvature along the shape of the body 101 of the wearable device 100.

As shown in FIG. 3, the circuit substrate 302 is arranged on a flexible support substrate 300. The support substrate 300 is in contact with the circuit substrate 302 and supports the circuit substrate 302. The support substrate 300 is an insulating substrate that transmits light and has flexibility and may be a plastic substrate such as polyimide or polyethylene terephthalate, or a glass substrate.

The circuit substrate 302 is made of a flexible material and may be a plastic substrate such as polyimide, polyethylene terephthalate, polyethylene naphthalate, and the like, or a glass substrate. A display unit 411*a*, a light emitting unit 305, and a light-receiving unit 307 are arranged on the circuit substrate 302. The display unit 411*a* is provided at a position corresponding to the display area 105. The light emitting unit 305 is provided at a position corresponding to the light emitting area 201. The light-receiving unit 307 is provided at a position corresponding to the light-receiving area 203.

The display unit 411*a* includes at least one light emitting element (second light emitting element) 304. The light emitting element 304 is arranged on the circuit substrate 302 and is electrically connected to the circuit substrate 302. The light emitting element 304 may be a light emitting diode that emits visible light. For example, the light emitting element 304 may be a micro-LED that emits red, green, or blue light. The light emitting element 304 may emit white light. The light emitting element 304 may be a chip-shaped micro-LED, and the micro-LED formed on an LED manufacturing wafer may be implemented on the circuit substrate 302.

The light emitting unit 305 includes at least one light emitting element (first light emitting element) 306. The light emitting element 306 is arranged on the circuit substrate 302 and is electrically connected to the circuit substrate 302. The light emitting element 306 may be an infrared light emitting diode (IR LED) that emits infrared rays. The light emitting element 306 may be a chip-shaped LED, and the LED formed on the LED manufacturing wafer may be adhered onto the circuit substrate 302 by an adhesive.

The light-receiving unit 307 includes at least one light-receiving element 308. The light-receiving element 308 is arranged on the circuit substrate 302 and is electrically connected to the circuit substrate 302. The light-receiving element 308 is an element capable of receiving the light emitted from the light emitting element 306, may be a CCD camera or an optical sensor. In the case where the light-receiving element 308 is an optical sensor, it can be formed on the circuit substrate 302 by a photolithography process. A chip-shaped photosensor may be implemented on the circuit substrate 302. In this case, the light-receiving element 308 may be mounted on the circuit substrate 302 in the same process as the process of mounting the light emitting elements 304, 306.

The light emitting elements 304, 306, and the light-receiving element(s) 308 arranged on the circuit substrate 302 are sealed by a sealing layer 310. The sealing layer 310 may contain, for example, a silicone resin. The electronic component arranged on the circuit substrate 302 is not limited to the light emitting elements 304, 306, and the light-receiving element 308, a CPU, a sensor, a memory, a driving circuit, or the like may be mounted.

A reflecting layer 312 is arranged on the sealing layer 310 at a position corresponding to at least the light emitting area 201. The reflecting layer 312 may contain a metal such as silicon oxide, titanium oxide, or silver. The reflecting layer 312 may have a single layer structure or a multilayer structure. The reflecting layer 312 reflects the infrared rays emitted from the light emitting element 306 toward the light-receiving area 203 facing the light emitting area 201. The light reflected by the reflecting layer 312 is received by the light-receiving element 308 in the light-receiving area 203.

As described above, in the present embodiment, elements can be arranged on the same surface on the circuit substrate 302. Therefore, it is possible to realize the thinning and lightening of the wearable device 100. Although not shown, a waterproof film or a protective film may be arranged on the sealing layer 310 and the reflecting layer 312.

The circuit substrate 302 may be provided with various thin film transistors that drive the first light emitting element 306, the second light emitting element 304, and the light-receiving element 308, and various wirings connected to the thin film transistors. In the case where the support substrate 300 is provided as a base substrate of the circuit substrate 302, the above-described thin film transistors or wirings may be formed on the support substrate 300, and the circuit substrate 302 may also be referred to as the circuit layer 302 formed on the support substrate 300.

The circuit substrate 302 may also be referred to as a backplane substrate, a thin film transistor substrate, an array substrate, or the like, and in the case where the forming and driving of the light emitting elements 304, 306, and the light-receiving elements 304 are completed on the circuit substrate 302, the support substrate 300 may simply function as a protective substrate for the circuit substrate 302.

Figure 4:
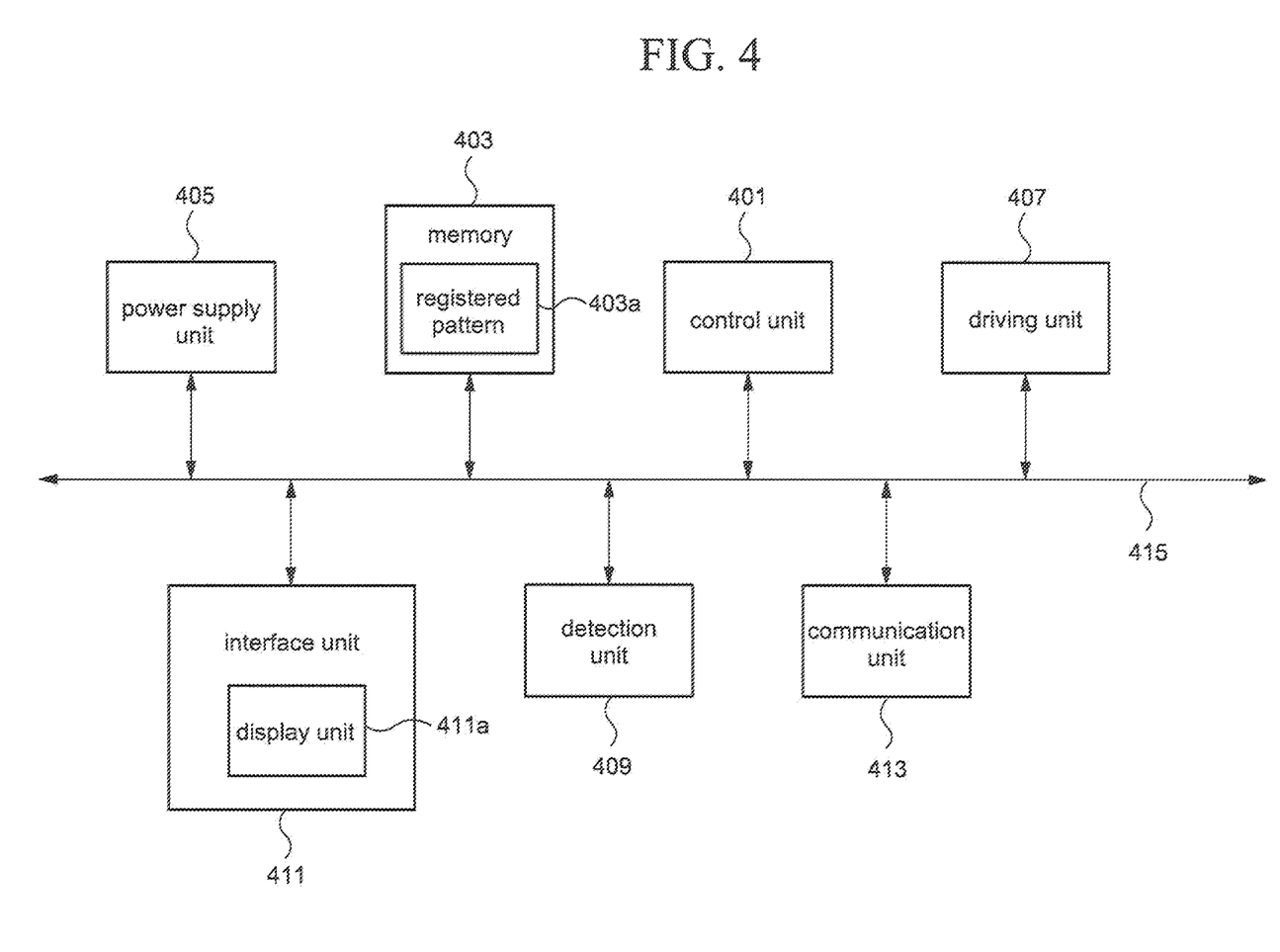
FIG. 4 is a block diagram for explaining a configuration of a wearable device according to an embodiment.

FIG. 4 is a block diagram for explaining a configuration of the wearable device 100 according to the present embodiment.

The wearable device 100 includes a control unit 401, a memory 403, a power supply unit 405, a driving unit 407, a detection unit 409, an interface unit 411, and a communication unit 413. These components are electrically connected to each other by a bus 415.

The control unit 401 controls the operation of the entire wearable device 100. The control unit 401 processes signals that are input and output by other components. The control unit 401 executes application programs stored in the memory 403, which will be described later, and provides or processes information or functions desired by the user.

The memory 403 stores data for executing functions of the wearable device 100. Specifically, the memory 403 stores multiple application programs executed by the wearable device 100, data and commands for the operation of the wearable device 100. At least a part of the application programs may be stored in the memory 403 in advance or may be downloaded from an external server by communication and stored. The memory 403 stores a registered pattern 403a which is the finger vein pattern of a user registered in advance.

The power supply unit 405 supplies a predetermined power supply to each component of the wearable device 100. The power supply unit 405 may include a battery. The battery may be a built-in battery or a removable and replaceable battery.

The driving unit 407 generates and outputs various signals for displaying an image on the display unit 411a, which will be described later, based on the control by the control unit 401.

The detection unit 409 acquires biometric data of a user who uses the wearable device 100. In this embodiment, the detection unit 409 acquires a finger vein pattern of a user who inserts a finger into the opening 103 of the body 101 of the wearable device 100. The detection unit 409 may be realized by the light emitting unit 305 and the light-receiving unit 307.

The detection unit 409 transmits the biometric data including the acquired finger vein pattern to the control unit 401. The control unit 401 reads out the registered pattern 403a, which is a finger vein pattern of a user registered in advance, from the memory 403, and determines whether the acquired finger vein pattern matches the registered pattern 403a by matching the acquired finger vein pattern with the registered pattern 403a, thereby authenticating the user.

The detection unit 409 may not only acquire the biometric data of the user but may also detect the insertion and removal of the user's finger into and from the opening 103. In other words, the detection unit 409 may detect whether the user's finger is inserted into the opening 103 or whether the user's finger is pulled out from the opening 103. In this case, the detection unit 409 may include a pair of electrodes. The pair of electrodes may be provided on the inner peripheral side of the body 101 so as to face each other. One of the pair of the electrodes is a positive electrode and the other electrode is a negative electrode. It is possible to detect the direction in which the user's finger moves through the opening 103 by detecting changes in the electromagnetic field between the pair of electrodes. That is, it is possible to detect whether the user's finger is inserted into the opening 103 or pulled out from the opening 103. In the case where it is detected that the user's finger is inserted into the opening 103, the detection unit 409 may acquire biometric data of the user. On the other hand, in the case where it is detected that the user's finger is pulled out from the opening 103, the control unit 401 may lock the wearable device 100.

The interface unit 411 is a user interface. The interface unit 411 may include the display unit 411a. The interface unit 411 may be realized by the display unit 411a provided in the display area 105 of the body 101 of the wearable device 100. The display unit 411a displays an image based on the control by the control unit 401. The display unit 411a may be a display device with a touch panel including a touch sensor. In this case, the display unit 411a functions as an interface for receiving an input from a user to the wearable device 100. The interface unit 411 may include a voice user interface.

The communication unit 413 communicates between the wearable device 100 and other external devices such as smartphones, external equipment, or external servers. The communication unit 413 may include, for example, Wi-Fi (registered trademark), Bluetooth (registered trademark), NFC, etc.

The above-described components of the wearable device 100 may cooperate with each other to execute the operation or the application programs of the wearable device 100.

The detection unit 409 of the wearable device 100 may acquire not only the user's finger vein pattern but also other biometric data. For example, the detection unit 409 can acquire personal biometric data of a user such as percutaneous arterial blood oxygen saturation ($SpO_2$), heart rate, blood pressure pulse wave, and fat rate. These biometric data can be acquired by receiving the infrared rays, which is emitted from the light emitting element 306 provided in the light emitting area 201 of the wearable device 100, by the light-receiving element 308. For example, oxyhemoglobin in blood tends to absorb wavelengths near the near infrared rays (940 nm). Heartbeats changes the blood flow in the blood vessels, which changes oxyhemoglobin content. Therefore, the heartbeat can be detected as a change in the amount of infrared rays' reflection.

Although the ring-type wearable device 100 according to the present embodiment has been described, the wearable device of the present disclosure is not limited thereto. The wearable device of the present disclosure may be a bracelet-type to be worn on a user's wrist, a wristwatch-type such as smart watch, or an ankle-type to be worn on a user's ankle.

Although the wearable device 100 according to the present embodiment has the ring-shaped body 101, the wearable device of the present disclosure is not limited thereto. For example, the wearable device of the present disclosure may have a ring-opening ring shape in which an opening is provided in a part of the ring-shaped body.

In the present embodiment, the case where the finger vein authentication is applied as the user authentication has been described. However, the user authentication by the wearable device 100 is not limited to the finger vein authentication, and other authentication methods such as a fingerprint authentication can be applied.

Second Embodiment

In the first embodiment described above, the case where the elements are arranged on the same surface on the circuit substrate 302 has been described. However, the wearable device of the present disclosure is not limited thereto.

Figure 5:
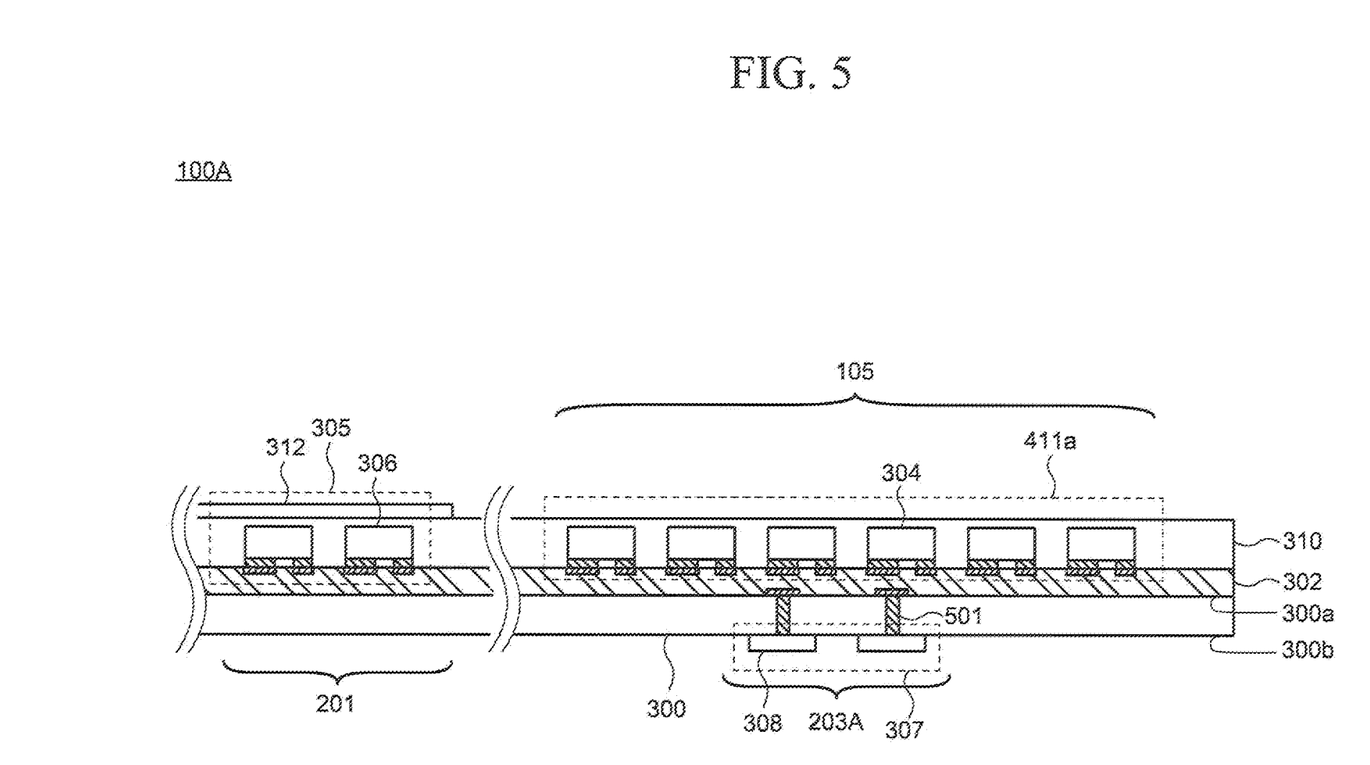
FIG. 5 is a cross-sectional view of a part of a circuit substrate arranged inside a wearable device according to another embodiment.

FIG. 5 is a cross-sectional view of a part of a circuit substrate arranged inside a wearable device 100A according to the second embodiment. The shape of the wearable device 100A according to the second embodiment is the same as that of the wearable device 100 according to the first embodiment of the present disclosure, which has been described with reference to FIG. 1, FIG. 2A, and FIG. 2B, and therefore, detailed descriptions thereof are omitted in the present embodiment.

In FIG. 5, as in FIG. 3, although the circuit substrate 302 is shown linearly for convenience of illustration, the circuit substrate 302 is provided along the ring-shaped body 101 of the wearable device 100A. That is, the circuit substrate 302 is bent at a predetermined curvature along the shape of the body 101 of the wearable device 100A.

As shown in FIG. 5, the circuit substrate 302 (the circuit layer 302) is arranged on a first surface 300a of the support substrate 300 (base substrate 300). Configurations of the support substrate 300 and the circuit substrate 302 are the same as those of the support substrate 300 and the circuit substrate 302 described in the first embodiment, and therefore descriptions thereof are omitted. The display unit 411a provided with the light emitting element 304 and the light emitting unit 305 provided with the light emitting element 306 are arranged on the circuit substrate 302. The light emitting elements 304, 306 are electrically connected to the circuit substrate 302. The light emitting elements 304, 306 are the same as the light emitting elements 304, 306 described in the first embodiment.

In the present embodiment, the light-receiving unit 307 provided with the light-receiving element 308 is arranged on the other side of the surface on which the display unit 411a and the light emitting unit 305 are provided. That is, the light-receiving element 308 is arranged on a second surface 300b opposite to the first surface 300a of the support substrate 300. The light-receiving element 308 is electrically connected to the circuit substrate 302. The support substrate 300 may be provided with a through electrode 501 for electrically connecting the light-receiving element 308 and the circuit substrate 302. The light-receiving element 308 is the same as the light-receiving element 308 described in the first embodiment.

Similar to the first embodiment, in the present embodiment, a light-receiving area 203A provided with the light-receiving element 308 is arranged so as to face the light emitting area 201 provided with the light emitting element 306 that emits infrared rays. In this embodiment, the light-receiving area 203A may be provided on an area overlapped with the display area 105. That is, the display area 105 and the light-receiving area 203A may face the light emitting area 201. The present embodiment is not limited to this, and the light-receiving area 203A may be arranged outside the area overlapped with the display area 105. In this case, the display area 105 and the light emitting area 201 do not face each other.

The light emitting elements 304, 306 arranged on the circuit substrate 302 are sealed by the sealing layer 310. Although not shown, a sealing layer for sealing the light-receiving element 308 may be arranged on the second surface 300b of the support substrate 300. The reflecting layer 312 is arranged on the sealing layer 310 at a position corresponding to at least the light emitting area 201.

Third Embodiment

Figure 6:
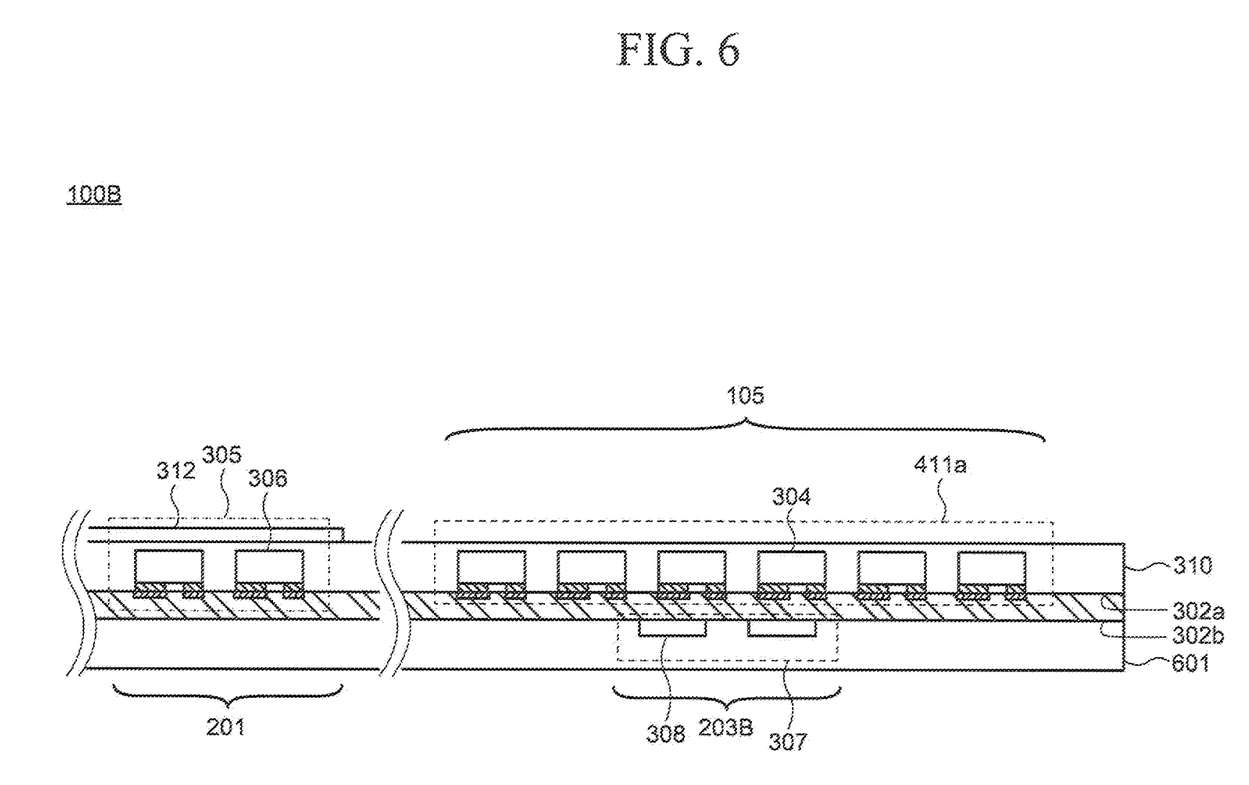
FIG. 6 is a cross-sectional view of a part of a circuit substrate arranged inside a wearable device according to another embodiment.

FIG. 6 is a cross-sectional view of a part of the circuit substrate arranged inside a wearable device 100B according to the third embodiment. The shape of the wearable device 100B according to the third embodiment is the same as that of the wearable device 100 according to the first embodiment of the present disclosure, which has been described with reference to FIG. 1, FIG. 2A, and FIG. 2B, and therefore, detailed descriptions thereof are omitted in the present embodiment.

In FIG. 6, similar to FIG. 3, although the circuit substrate 302 is shown linearly for convenience of illustration, the circuit substrate 302 is provided along the ring-shaped body 101 of the wearable device 100B. That is, the circuit substrate 302 is bent at a predetermined curvature along the shape of the body 101 of the wearable device 100B.

In the wearable device 100B according to the present embodiment, the display unit 411a provided with the light emitting element 304 and the light emitting unit 305 provided with the light emitting element 306 are arranged on the first surface 302a of the circuit substrate 302, and the light-receiving unit 307 provided with the light-receiving device 308 is arranged on the second surface 302b opposite to the first surface 302a. Each of the light emitting elements 304, 306 and the light-receiving element 308 is electrically connected to the circuit substrate 302. The configuration of the circuit substrate 302 is the same as the configuration of the circuit substrate 302 described in the first embodiment, a description thereof will be omitted.

A sealing layer 310 for sealing the light emitting elements 304, 306 is arranged on the first surface 302a of the circuit substrate 302. The reflecting layer 312 is arranged on the sealing layer 310 at a position corresponding to at least the light emitting area 201. On the other hand, a sealing layer 601 for sealing the light-receiving element 308 is arranged on the second surface 302b of the circuit substrate 302. The sealing layer 601 may contain, for example, a silicone resin.

In the present embodiment, unlike the second embodiment described above, the light-receiving element 308 is directly mounted on the second surface 302b opposite to the first surface 302a of the circuit substrate 302 provided with the light emitting elements 304, 306. In the wearable device 100B according to the present embodiment, the support substrate 300 in the wearable device 100 according to the first embodiment and the wearable device 100A according to the second embodiment may be omitted.

Fourth Embodiment

In the first embodiment, the second embodiment, and the third embodiment described above, the light emitting elements 304, 306, and the light-receiving element 308 are electrically connected to one circuit substrate 302. However, the wearable device of the present disclosure is not limited thereto.

Figure 7:
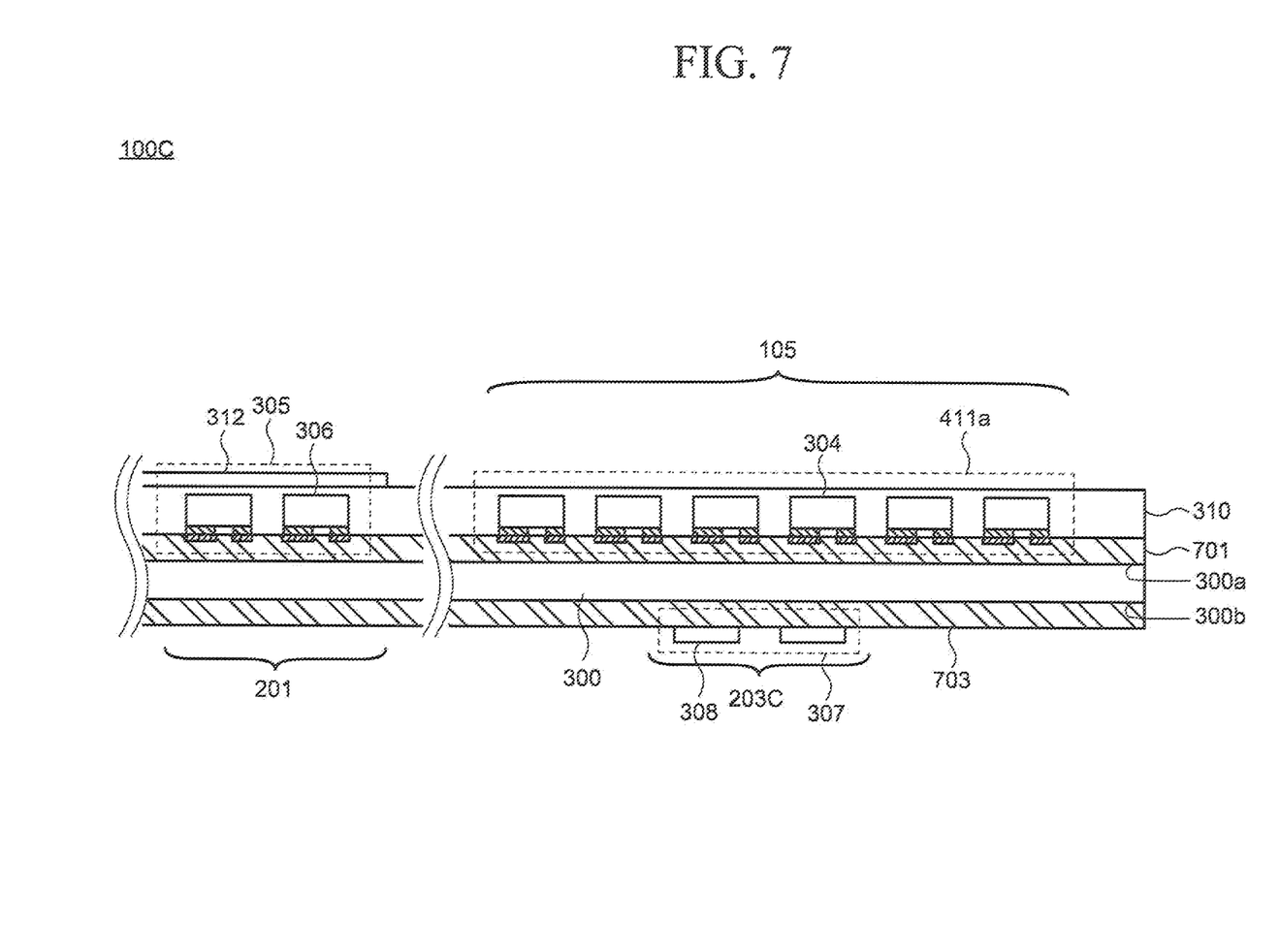
FIG. 7 is a cross-sectional view of a part of a circuit substrate arranged inside a wearable device according to another embodiment.

FIG. 7 is a cross-sectional view of a part of the circuit substrate arranged inside a wearable device 100C according to the fourth embodiment. The shape of the wearable device 100C according to the fourth embodiment is the same as that of the wearable device 100 according to the first embodiment of the present disclosure, which has been described with reference to FIG. 1, FIG. 2A, and FIG. 2B, and therefore, detailed descriptions thereof are omitted in the present embodiment.

In the wearable device 100C according to the present embodiment, a first circuit substrate 701 is arranged on the first surface 300a of the support substrate 300, and the second circuit substrate 703 is arranged on the second surface 300b opposite to the first surface 300a. In FIG. 7, similar to FIG. 3, the first circuit substrate 701 and the second circuit substrate 703 are shown linearly for convenience of explanation. In practice, however, the first circuit substrate 701 and the second circuit 703 are provided along the ring-shaped body 101 of the wearable device 100C. That is, the first circuit substrate 701 and the second circuit substrate 703 are bent at a predetermined curvature along the shape of the body 101 of the wearable device 100C.

Since the configuration of the support substrate 300 is the same as that of the support substrate 300 described in the first embodiment, the description thereof is omitted in the present embodiment. The first circuit substrate 701 is arranged on the first surface 300a of the support substrate 300. The first circuit substrate 701 is composed of a flexible material. The first circuit substrate 701 may be a plastic substrate such as polyimide, polyethylene terephthalate, or polyethylene naphthalate, or a glass substrate. The display unit 411a provided with the light emitting element 304 and the light emitting unit 305 provided with the light emitting element 306 are arranged on the first circuit substrate 701. The light emitting elements 304, 306 are electrically connected to the first circuit substrate 701. The light emitting elements 304, 306 are the same as the light emitting elements 304, 306 described in the first embodiment.

The second circuit substrate 703 is arranged on the second surface 300b of the support substrate 300. The second circuit substrate 703 is composed of a flexible material. The second circuit substrate 703 may be a plastic substrate such as polyimide, polyethylene terephthalate, polyethylene naphthalate, or a glass substrate. The light-receiving unit 307 provided with the light-receiving element 308 is arranged on the second circuit substrate 703. The light-receiving element 308 is electrically connected to the second circuit substrate 703.

Similar to the first embodiment, in the present embodiment, a light-receiving area 203C provided with the light-receiving element 308 is arranged so as to face the light emitting area 201 provided with the light emitting element 306 that emits infrared rays. As shown in FIG. 7, the light-receiving area 203C may be arranged on an area overlapped with the display area 105. That is, the display area 105 and the light-receiving area 203C may face the light emitting area 201. The present embodiment is not limited to this, and the light-receiving area 203C may be arranged outside the area overlapped with the display area 105. In this case, the display area 105 and the light emitting area 201 do not face each other.

The light emitting elements 304, 306 arranged on the first circuit substrate 701 are sealed by the sealing layer 310. Although not shown, a sealing layer for sealing the light emitting element 306 may be arranged on the second circuit substrate 703. The reflecting layer 312 is arranged on the sealing layer 310 at a position corresponding to at least the light emitting area 201.

Fifth Embodiment

Figure 8:
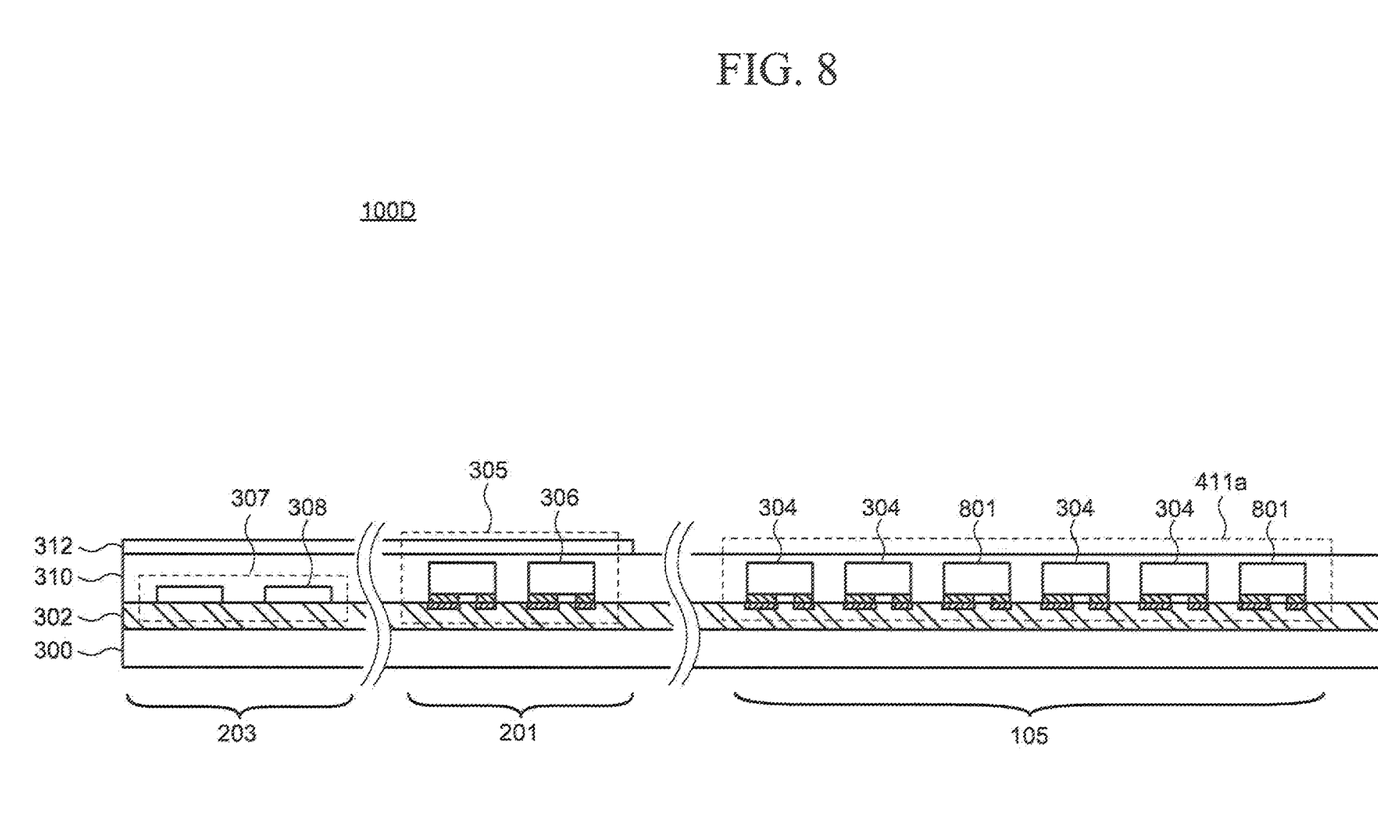
FIG. 8 is a cross-sectional view of a part of a circuit substrate arranged inside a wearable device according to another embodiment.

FIG. 8 is a cross-sectional view of a part of a circuit substrate arranged inside a wearable device 100D according to the fourth embodiment. The shape of the wearable device 100D according to the fourth embodiment is the same as that of the wearable device 100 according to the first embodiment of the present disclosure, which has been described with reference to FIG. 1, FIG. 2A, and FIG. 2B, and therefore, detailed descriptions thereof are omitted in the present embodiment.

In FIG. 8, similar to FIG. 3, although the circuit substrate 302 is shown linearly for convenience of illustration, the circuit substrate 302 is provided along the ring-shaped body 101 of the wearable device 100D. That is, the circuit substrate 302 is bent at a predetermined curvature along the shape of the body 101 of the wearable device 100D.

As shown in FIG. 8, the circuit substrate 302 is arranged on the support substrate 300. Since the configurations of the support substrate 300 and the circuit substrate 302 are the same as those in the first embodiment, descriptions thereof are omitted in the present embodiment. The display unit 411a provided with the light emitting element 304, the light emitting unit 305 provided with the light emitting element 306, and the light-receiving unit 307 provided with the light-receiving element 308 are arranged on the circuit substrate 302. The light emitting elements 304, 306 and the light-receiving element 308 are electrically connected to the circuit substrate 302. The light emitting elements 304, 306 and the light-receiving element 308 are the same as those in the first embodiment.

In the present embodiment, in the display area 105, at least one light emitting element 801 (third light emitting element) for communication is provided together with the light emitting element 304 constituting the display unit 411a. The light emitting element 801 is a micro-LED emitting white light or an infrared light emitting diode emitting infrared light. The light emitting element 801 may be regularly arranged between the light emitting element 304 or may be irregularly arranged. The light emitting element 801 may be arranged to surround the light emitting element 304.

The light emitting element 801 is used for optical wireless communication with other external devices such as smart phones and external equipment by Wi-Fi. The light emitting element 801 outputs optical signals modulated to various rates. In the case where the light emitting element 801 is a white light emitting diode, the light emitting element 801 may not only function as a light source for communication but may also configure the display unit 411a together with the light emitting element 304. That is, the light emitting element 801 can also be used as a light emitting element for image display.

In the present embodiment, although the case where the light emitting element 801 is arranged in the display area 105 together with the light emitting element 304 has been described, the position where a light emitting element 704 is arranged is not limited to this. In the case where the light emitting element 801 is used as a light source for optical communication, the light emitting element 801 may be arranged outside the area corresponding to the display area 105. In this case, in the body 101, the area corresponding to the position where the light emitting element 801 is arranged may be provided with an opening for transmitting the light emitted from the light emitting element 801.

In the present embodiment, the arrangement of the light emitting elements 304, 306 and the light-receiving element 308 is the same as that of the first embodiment described above. However, the light emitting element 801 of the present embodiment may be applied to the configurations of the second embodiment, the third embodiment, and the fourth embodiment described above.

While the embodiments of the present disclosure have been described above, those in which a skilled in the art appropriately adds, deletes, or changes designs of constituent elements, or adds, omits, or changes conditions of steps based on the wearable device of the embodiments described above are also included in the scope of the present invention as long as the gist of the present invention is provided.

Even if it is other advantageous effects which differ from the advantageous effect brought about by the mode of each above-mentioned embodiment, what is clear from the description in this description, or what can be easily predicted by a person skilled in the art is naturally understood to be brought about by the present invention.

What is claimed is:

1. A wearable device comprising:
a body configured to surround the outside of a subject;
a light emitting unit arranged on an inner periphery of the body and including at least one first light emitting element;
a light receiving unit arranged on the inner periphery of the body and arranged opposite the light emitting unit;
a display unit arranged on an outer periphery of the body and including at least one second light emitting element;
a first flexible substrate mounted with the at least one first light emitting element and the at least one second light emitting element; and
a support substrate,
wherein the first flexible substrate has a first surface and a second surface opposite to the first surface,
the at least one first light emitting element and the at least one second light emitting element are mounted on the first surface of the first flexible substrate,
the support substrate has a third surface and a fourth surface opposite to the third surface,
the first flexible substrate is arranged on the third surface of the support substrate,
the light receiving unit includes at least one light receiving element, and
the at least one light receiving element is mounted on the fourth surface of the support substrate.

2. The wearable device according to claim 1, wherein the support substrate has a through electrode passing through the first surface and the second surface, and the through electrode electrically connects the at least one light receiving element to the first flexible substrate.

3. The wearable device according to claim 1, further comprising a third light emitting element mounted on the surface where the at least one first light emitting element and the at least one second light emitting element are mounted of the first flexible substrate and outputting a modulated optical signal.

4. The wearable device according to claim 1, further comprising a reflective layer arranged over the at least one first light emitting element,
wherein the reflective layer reflects the light emitted from the at least one first light emitting element toward the light receiving unit.

5. The wearable device according to claim 1, wherein the at least one first light emitting element emits infrared light, and the at least one second emitting element emits visible light.

6. The wearable device according to claim 3, wherein the third light emitting element emits visible light or infrared light.

7. A wearable device comprising:
a body configured to surround the outside of a subject;
a light emitting unit arranged on an inner periphery of the body and including at least one first light emitting element;
a light receiving unit arranged on the inner periphery of the body and arranged opposite the light emitting unit;

a display unit arranged on an outer periphery of the body and including at least one second light emitting element;
a first flexible substrate mounted with the at least one first light emitting element and the at least one second light emitting element; and
a support substrate,
wherein the first flexible substrate has a first surface and a second surface opposite to the first surface,
the at least one first light emitting element and the at least one second light emitting element are mounted on the first surface of the first flexible substrate,
the support substrate has a third surface and a fourth surface opposite to the third surface,
the first flexible substrate is arranged on the third surface of the support substrate,
a second flexible substrate is arranged on the fourth surface of the support substrate, and
the at least one light receiving element is arranged on the second flexible substrate.

\* \* \* \* \*